United States Patent

Nam

[11] Patent Number: 5,867,283
[45] Date of Patent: Feb. 2, 1999

[54] DEVICE AND METHOD FOR DETERMINING TRANSMISSION/ RECEPTION/DUPLICATION POSITIONS IN FACSIMILE SYSTEM

[75] Inventor: Dong-Su Nam, Gumi, Rep. of Korea

[73] Assignee: SamSung Electronics Co., Ltd., Kyungki-do, Rep. of Korea

[21] Appl. No.: 742,122

[22] Filed: Oct. 31, 1996

[30] Foreign Application Priority Data

Oct. 31, 1995 [KR] Rep. of Korea .................. 1995-38745

[51] Int. Cl.⁶ ........................................................ H04N 1/04
[52] U.S. Cl. ............................................ 358/498; 358/472
[58] Field of Search .................................... 358/472, 474, 358/496–498; 360/104, 105, 109; H04N 1/04, 1/14

[56] References Cited

U.S. PATENT DOCUMENTS

| | | | |
|---|---|---|---|
| 4,025,178 | 5/1977 | Yokozawa et al. | 355/3 R |
| 4,032,231 | 6/1977 | Zucker | 355/49 |
| 4,039,832 | 8/1977 | Kvarnegard | 250/318 |
| 4,636,871 | 1/1987 | Oi | 358/296 |
| 5,077,614 | 12/1991 | Stemmle et al. | 358/472 |
| 5,264,949 | 11/1993 | Stemmle | 358/472 |
| 5,420,697 | 5/1995 | Tuli | 358/472 |
| 5,422,732 | 6/1995 | Takayanagi | 358/400 |
| 5,475,504 | 12/1995 | Ogura et al. | 358/474 |
| 5,523,848 | 6/1996 | Musso et al. | 358/498 |
| 5,539,538 | 7/1996 | Terao | 358/472 |
| 5,570,205 | 10/1996 | Sugita et al. | 358/472 |

FOREIGN PATENT DOCUMENTS

0369299 A2  5/1990  European Pat. Off. .
0553579 A1  8/1993  European Pat. Off. .

*Primary Examiner*—Kim Yen Vu
*Attorney, Agent, or Firm*—Robert E. Bushnell, Esq.

[57] ABSTRACT

A compact and efficiently designed facsimile device that is capable of performing transmission, reception, and duplication functions. The efficiency is brought about by using only one stepping motor to drive all the functions of the facsimile apparatus. The mode selection is accomplished by separating either the thermosensitive recording head or the scanner away from the white roller when a particular mode of operation does not require their use. This is accomplished by placing eccentric cams on the same axle as said white roller and on both sides of said white roller. During duplication, both the thermosensitive recording head and the sensor are in contact with the white roller. During transmission or reception mode, the eccentric cams are rotated so that the thermosensitive recording head and the sensor respectively are pushed away from the white roller by the apogees of both cams. Signals external to the device are fed to a sensor which are relayed to the stepping motor to control which mode of operation is employed at any particular time.

20 Claims, 3 Drawing Sheets

DEVICE AND METHOD FOR DETERMINING TRANSMISSION/ RECEPTION/DUPLICATION POSITIONS IN FACSIMILE SYSTEM

CLAIM OF PRIORITY

This application makes reference to, incorporates the same herein, and claims all benefits accruing under 35 U.S.C. §119 arising from an application for Device and Method for Determining Transmission/Reception/ Duplication Positions in Facsimile System earlier filed in the Korean Industrial Property Office on the 31st of Oct., 1995 and there duly assigned Ser. No. 38745/1995.

FIELD OF THE INVENTION

The present invention relates to a facsimile system, and more particularly, to a facsimile system that is capable of transmitting, receiving, and duplicating documents.

BACKGROUND OF THE INVENTION

The facsimile printers, colloquially known as a facsimile machine, are constructed with stages for scanning documents as well as stages for recording information onto media such as thermosensitive paper. In addition, a facsimile printer can accomplish both functions simultaneously, thus allowing for duplication of documents. Often, such facsimile printers can be costly and cumbersome. Frequently, two motors are employed, one to convey the paper and the other to drive the scanning and recording operations. Early efforts to use only one stepping motor in a facsimile device is represented by, for example, U.S. Pat. No. 4,636,871 for a Copying Machine to Oi discloses a copy machine able to both scan and print onto a sheet of paper. The machine uses a single motor, and uses a gearing mechanism to drive the paper feeding roller while using an eccentric rotating cam to move a slide bar laterally so that reading elements and printing elements can operate. Oi '871 allows one motor to accomplish both the tasks of paper conveyance and duplication.

U.S. Pat. No. 4,025,178 for an Electrophotographic Copying Apparatus Having a Dual Cam Synchronizing Mechanism to Yokozawa et al. uses cams to feed paper into the machine. U.S. Pat. No. 4,039,832 for an Apparatus for Thermographic Duplication of Information Comprising a Curve or Cam Member for Axial Movement of Dye Carrier to Kvarnegard uses a cam to drive and change the direction of the drive axle of a dye carrier. Camming action is incorporated into the duplication of document process. U.S. Pat. No. 4,032,231 for a Multiple Range Variable Magnification Reproduction Machine Using Three-Dimensional Cam to Zucker uses a three dimensional cam to adjust the scanning speed and the scanning distances. U.S. Pat. No. 5,077,614 for a Scanner with Document and Copy Sheet Registration Means to Stemmle et al. endeavors to provide a photocopying device able to scan an original document at the same time the recording medium is printed, by constructing the device with a scanner on one side of the drive rollers while a printer is positioned on the other side of the drive rollers opposite from the scanner.

U.S. Pat. No. 5,539,538 for a Facsimile Machine Having a Single Feeding Path for Document and Recording Sheet to Terao, U.S. Pat. No. 5,475,504 for an Image Reading Device Detachable from Main Body to Ogura et al., and U.S. Pat. No. 5,523,848 for an Ink Jet Printing Device and Plain Paper Facsimile Apparatus Using the Same to Musso disclose various facsimile printers and photocopying devices using designs that endeavor to provide a single path for both scanning and the printing operations.

Although the various efforts represented by the foregoing designs have endeavored to enhance the operational performance of image formation equipment, I have discovered that it is possible to simplify the structure of duplicating and facsimile equipment while maintaining. reliability.

SUMMARY OF THE INVENTION

Accordingly, it is an object to provide an improved device capable of transmitting, receiving, and duplicating documents.

It is an object to provide for a duplication feature that simultaneously duplicates a scanned document.

It is still another object to accomplish the above tasks through the use of a single stepping motor.

It is yet another object to provide a device where the mode selection is accomplished by rotatable eccentric cams that push away and displace from the white roller either the scanner or the print head when either one is not needed to perform the current, selected operation.

It is still yet another object to provide a sensor switch to allow for mode selection between transmission mode, reception mode, duplication mode, and standby mode.

It is also an object to provide a image formation apparatus and process able to rely upon a single electrically powered motor to provide motive power for both formation of images upon media and for conveyance of that media, as well as for shifting the apparatus between operational modes.

To achieve these and other objects, the facsimile system is configured with a roller bearing a white exterior cylindrical surface coaxially mounted upon a axle, enabling processing and conveyance of documents and thermosensitive recording paper. On each end of the white roller, an eccentric cam is positioned on the axle, capable of rotation about the axle. The apogee for both cams always extend in the same direction. The apogee for each cam extends radially further out from the axle than the outer surface of the white roller. The perigee as well as the remainder of the edge of the cam does not extend radially beyond the outer surface of the white roller. On opposite sides of the white roller are the recording head and the scanner. At any given time, one or both of the recording head and the scanner are in contact with the white roller, depending on the orientation of the apogee of the eccentric cams positioned on the axle, which, in turn, depends on the mode of operation that is selected.

The white roller and axle, the scanner, and the recording head are positioned between two frames. A single bidirectional stepping motor mounted on one of the frames controls both the orientation of the apogee of the cams and the rotation of the white roller. A gearing unit and a shaft are used to convey power from the bidirectional stepping motor to the cams and the white roller, depending on the direction of rotation of the stepping motor.

In addition, mode selection changes are made through an external lead, leading to a sensor, connected to a sensor detecting lever. The sensor remains in contact with the sensor detecting lever only during transmission mode. In stand-by mode, reception mode, and in duplication mode, the sensor detecting lever becomes disjoined from the sensor. With the above features assembled, a compact, inexpensive facsimile system results that can either duplicate, transmit, or receive documents at the discretion of a user.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
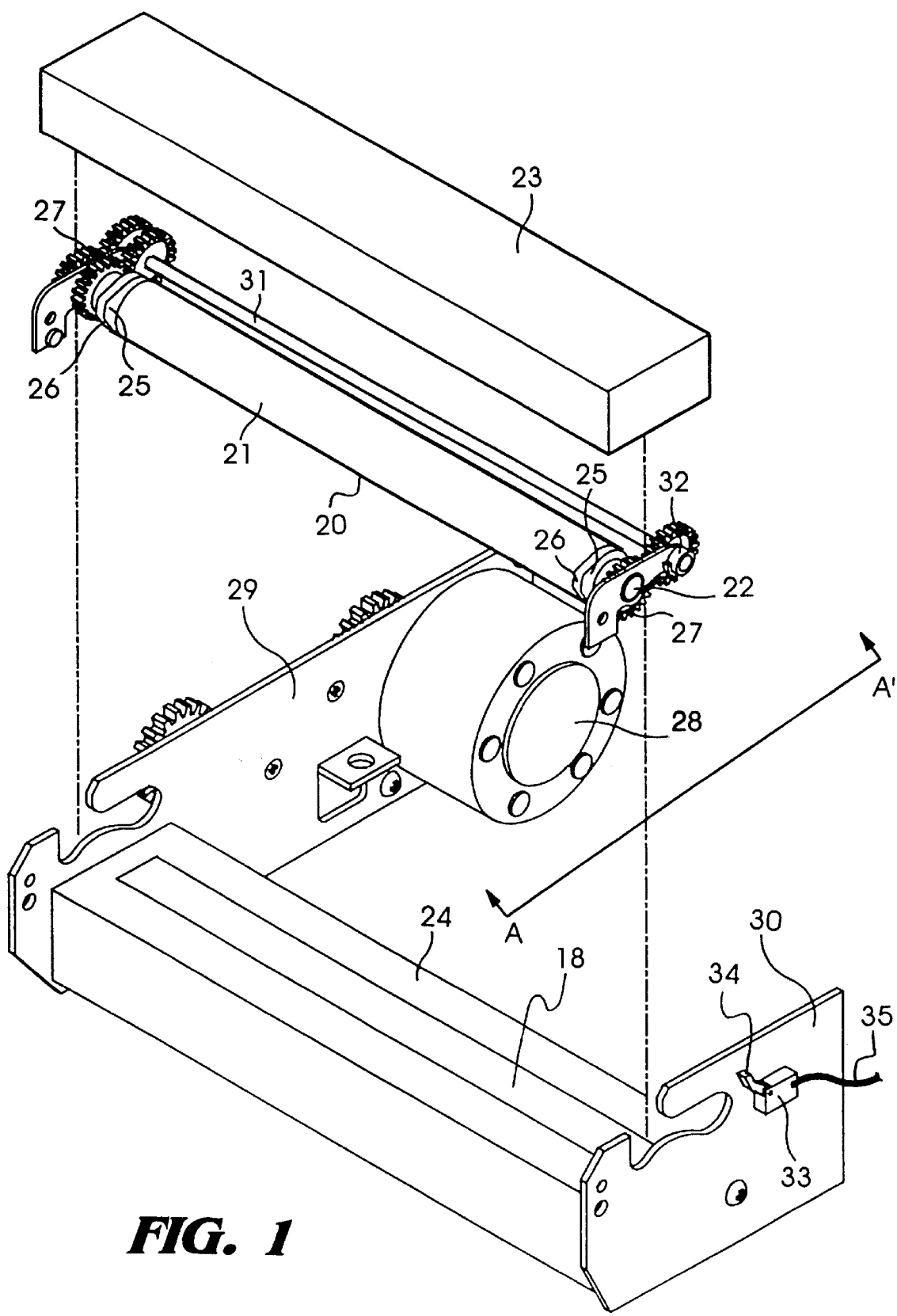
FIG. 1 is a perspective view illustrating the construction of a facsimile system with a thermosensitive recording head and a contact image sensor installed in upper and lower portions respectively of a while roller according to the principles of the present invention.
Figure 2:
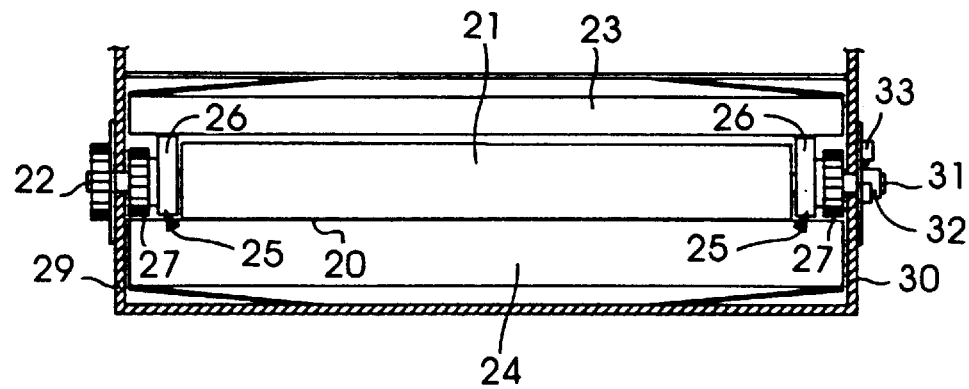
FIG. 2 is an elevational cross-sectional view showing main components of an image formation apparatus arranged according to the principles of the present invention.

Turning to the drawings, FIGS. 1 and 2 provide views illustrating the construction of a facsimile system where a thermosensitive recording head 23 and a contact image sensor 24 are respectively installed in diametrically opposite upper and lower sides of a roller 20 bearing a white circumferential exterior surface 21, in one embodiment of the present invention. As shown in FIGS. 1 and 2, white roller 20, thermosensitive recording head 23, and contact image sensor 24 are installed between vertical sidewalls formed by first and second frames 29, 30 positioned on axially opposite ends of roller 20. White roller 20 is coaxially mounted on and rotates about axle 22. The frames 29 and 30 position the thermosensitive recording head 23 and the contact image sensor 24 in parallel axial alignment with axle 22, as illustrated in FIGS. 1 and 2. A pair of radially aligned, eccentric cams 25 having cam lobes forming apogee 26 and having a perigee 26A, are mounted on axle 22 at axially opposite ends of roller 20, and also rotate about axle 22. Each cam 25 terminates one end of the white circumferential exterior surface 21 of roller 20.

Figure 4:
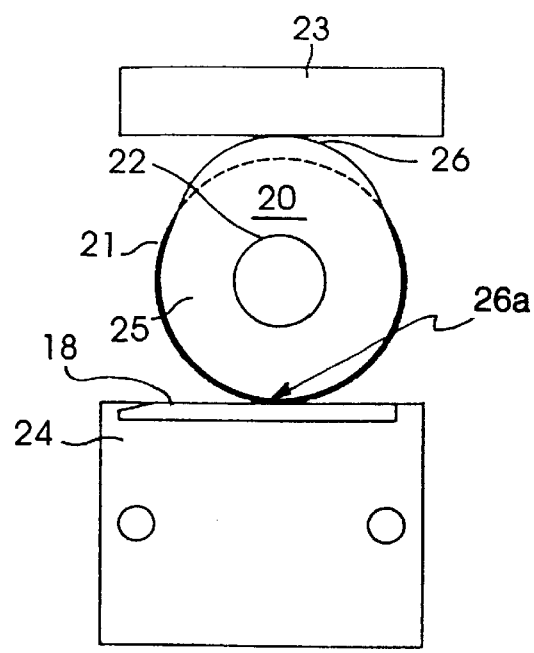
FIG. 4 is a side elevational view showing the axle supporting the white roller and a cam of FIG. 1 during transmission mode, taken in the direction of sectional line AA', with the gearing unit removed for clarity of illustration.

Referring now to FIG. 4, during the transmission mode, lobes 26 of cams 25 hold thermosensitive recording head 23 spaced radially apart from white surface 21, while window 18 remains in tangential physical contact with white surface 21. Accordingly, reading (i.e., optical scanning) and electrical transmission of images borne by an original document such as a cut sheet of paper (not shown) may be performed because white roller 21 is in close physical, tangential contact with the elongated transparent window 18 formed in scanner 24 to extend transversely across the path of conveyance of the document, and the juxtaposition of window 18 and white surface 21 conveys a document face down between rotating white roller 20 and scanner 24.

Figure 5:
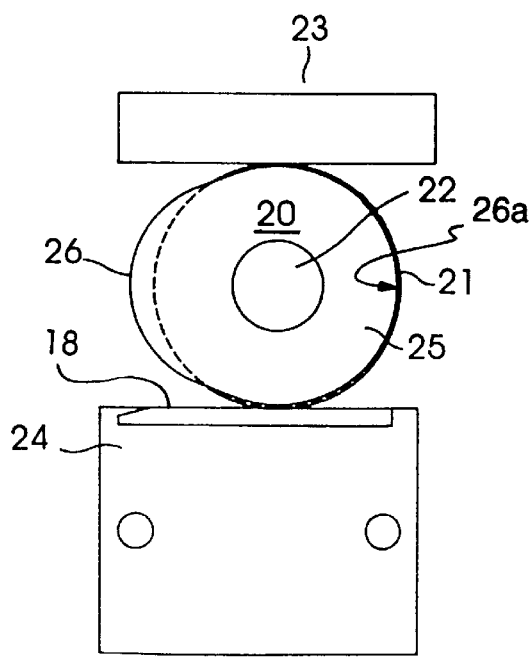
FIG. 5 is a side elevational view showing the axle supporting the white roller and a cam of FIG. 1 during a duplication mode, taken in the direction of sectional line AA', with the gearing unit removed for clarity of illustration.

Referring to FIG. 5, duplication of the images borne by an original document can occur while scanner 24 and thermosensitive recording head 23 are both in diametrically opposite, tangential physical contact with white surface 21 of roller 20. The particular embodiment shown in FIGS. 1, 2, and 5 show thermosensitive recording head 23 and scanner 24 to be on approximately diametrically opposite sides of roller 20. During duplication, the lobes 26 of cams 25 are positioned intermediate recording head 23 and image sensor 24; accordingly, both recording head 23 and image sensor 24 are in tangential physical contact with white surface 21. Consequently, an original document is conveyed between roller 21 and scanner 24 while thermosensitive paper is conveyed between white roller 20 and thermosensitive recording head 23. Images borne by the original document are read (i.e., scanned) as the original document passes between window 18 and white surface 21; those scanned images are then reproduced (ie., printed) onto thermosensitive paper as that thermosensitive paper is conveyed along the path extending between white surface 21 and thermosensitive recording head 23. Printing of the scanned images onto thermosensitive paper occurs substantially simultaneously with the scanning of those images from the original document, albeit with a slight time lag.

Figure 6:
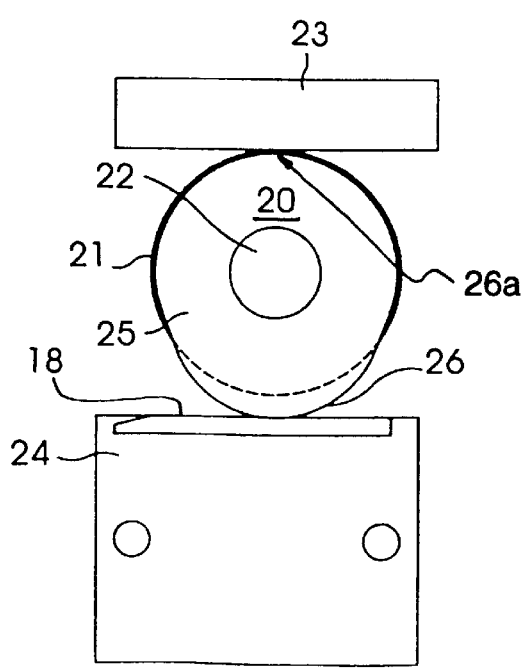
FIG. 6 is a side elevational view showing the axle supporting the white roller and a cam of FIG. 1 during reception mode, taken in the direction of sectional line AA, with the gearing unit removed for clarity of illustration.

Referring to FIG. 6, during the reception mode lobes 26 of cams 25 force contact image sensor 24 radially outwardly from white surface 21 while thermosensitive recording head 23 remains in tangential physical contact with white surface 21. Accordingly, reception of binary data corresponding to images borne by a document that have been electro-optically scanned and transmitted by another apparatus, may be accomplished because white surface 21 is in close physical tangential contact with thermosensitive recording head 23. During reception, thermosensitive paper is conveyed along a path extending between white surface 21 and thermosensitive recording head 23 by the rotation of roller 21 as it rotates around axle 22.

Mode selection is accomplished by rotating the pair of cams 25 on axle 22 so as to orient the lobes, or apogees, 26 of cams 25 in a particular direction. Since the lobes, or apogees 26 of cams 25 protrudes a greater distance from axle 22 than the outer surface of white roller 21, the lobes, or apogee 26 of cams 25 are capable of alternately displacing thermosensitive recording head 23 and scanner 24 away from white roller 20, thereby preventing the rotation of white surface 21 from conveying thermosensitive media past recording head 23, and thus making the displaced thermosensitive recording head temporarily inoperable.

For example, if the lobes, or apogees 26 of cams 25 are rotated so as to be oriented radially upwardly as shown in FIG. 4, thermosensitive recording head 23 is pushed upward and is radially separated from white roller 20, causing thermosensitive recording head 23 to be inoperable. It is in this situation that the apparatus may be used for scanning and transmitting images borne by an original document, because scanner 24 remains in tangential physical contact with white roller 20. As white roller 20 rotates, the force tangentially applied to that original document by the close physical contact between roller 20 and window 18, conveys the original document fed face down between scanner 24 and white roller 20, thereby enabling images borne by the original document to be read and electro-optically transmitted over, for example, a telephone line.

In another situation shown in FIG. 6, if the lobes, or apogees 26 of cams 25 are rotated so that their lobes, or apogees 26 are oriented radially downwardly, scanner 24 is forced radially away and separated from white roller 20, making the transmission function inoperable. Meanwhile, thermosensitive recording head 23 maintains contact with white roller 21 allowing for reception of images and data provided white roller 20 rotates and thermosensitive paper is fed between white roller 20 and thermosensitive print head 23.

If the lobes, or apogees 26 of cams 25 are rotated so as to be oriented radially to the left as shown in FIG. 5, both thermosensitive recording head 23 and scanner 24 are in contact with white roller 21, allowing for a duplication operation (ie., simultaneous scanning by contact image sensor of the information borne by an original document conveyed past sensor 24 by rotation of roller 20, and duplication of that information onto a thermosensitive media conveyed past recording head 23 by the same rotation of roller 20) to be performed. This scenario is shown in FIG. 5. If, in FIG. 5, white roller 21 rotates while thermosensitive paper is fed between white roller 21 and scanner 23 while an image containing document is fed between white roller 21 and scanner 24, immediate duplication can be performed from the image containing document to the thermosensitive paper.

In addition to using eccentric cams to determine which mode of operation the facsimile apparatus will perform, embodiments of the present invention feature a single stepping motor 28 providing the motive power driving all the features of the printer. When driven in a forward direction, stepping motor 28 causes eccentric cams 25 to sequentially rotate between the stand-by, transmission, duplication and reception modes of operation, while white roller 20, operationally connected to the motor by, for example, a unidirectional clutch oriented to turn roller 20 only while the clutch is driven by the motor in a reverse direction, remains stationary and thus unable to convey paper relative to either recording head 23 or image sensor 24. When stepping motor 28 is driven in a reverse direction, the clutch engages a gear mounted to turn axle 22 and white roller 21 is rotated, thereby allowing paper to be conveyed and processed (e.g., either scanned or printed) by the facsimile apparatus, while eccentric cams 25 remain stationary. Thus, the principles of the present invention may be implemented with an embodiment using only a single motor to both convey documents and therosensitive media, as well as to set the operational modes of the apparatus.

Figure 7:
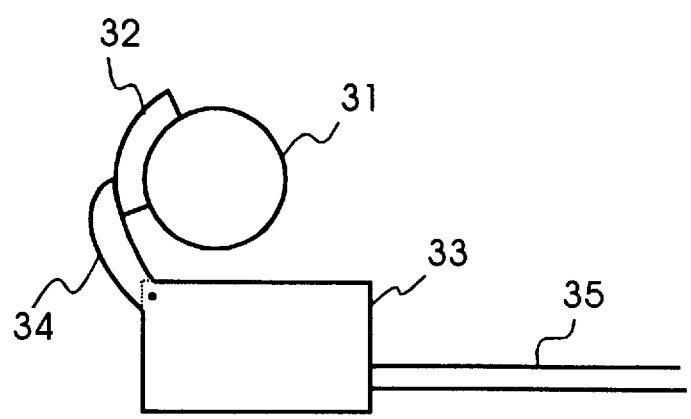
FIG. 7 is a detailed view showing the relative positions of a sensor and sensor detecting lever.
Figure 3:
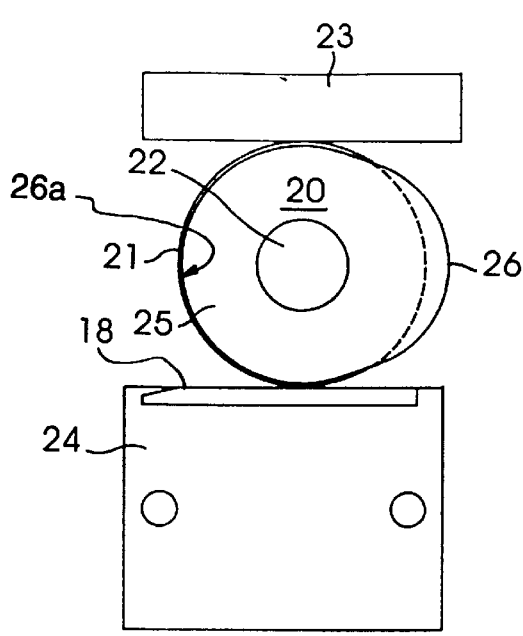
FIG. 3 is a side elevational view showing the axle supporting the white roller and a cam of FIG. 1 during a stand-by mode, taken in the direction of sectional line AA', with the gearing unit removed for clarity of illustration.

Stepping motor 28 drives cams 25 and the white roller 21 via gear unit 27 and shaft 31. Shaft 31 is connected to second frame member 30 and is used to transmit power from stepping motor 28 located on first frame member 29 to the opposite side of the device where second frame member 30, sensor detecting lever 32, and sensor or status sensor 33 are located. Sensor unit 33 is mounted on the sidewall of frame 30, with a toggle lever 34 that controls the contact wiper within sensor 33 positioned to be displaced by the rotation of camming surface 32 that arcuately subtends part of the exterior circumference of shaft 31, to displace lever 34 and thereby change the electrical conduction states of sensor 33. Displacement of lever 34 by camming surface 32 may be used to direct stepping motor 28 as to which direction and as to which mode to operate in. Sensor 33 (e.g., a microswitch) is controlled by signals from a source (e.g., a keypad mounted on the exterior of the housing for the printer, and operated by a user) external to the device through a set of a plurality of electrical leads 35. As shown in FIG. 7, lever 34 on sensor 33 remains in contact with sensor detecting lever 32 during the transmission mode represented by FIG. 4, but becomes disjoined from sensor detecting lever 32 during reception, duplication, and stand-by mode. Sensing detecting lever 32 is installed on shaft 31 for transmitting the driving force of stepping motor 28, so sensor detecting lever 32 and sensor 33 can be joined to or disjoined from each other according to the rotation of the sensor detecting lever 32.

Sensor 33 as stated hereinabove may have different switch-on/switch-off point in accordance with its position. When one sensor 33 is used, the switch-on/off of the sensor 33 can be executed once or twice according to the configuration of the sensor detecting lever 32. Further, the switch on/off of the sensor 33 may be executed once by using two sensors.

According to the present invention as described above, the thermosensitive recording head and the contact image sensor are respectively provided to the upper and lower portions of the white roller in the facsimile system and transmission/reception/duplication operations of the document may be performed in dependence with the position of the cams installed at the white roller. Besides, one stepping motor is employed to the present invention for selectively conveying the document and the thermosensitive recording paper. As a result, the present invention has some advantages in terms of manufacture of a small-sized and reliable facsimile system.

While there have been illustrated and described what are considered to be preferred embodiments of the present invention as incorporated into a facsimile system that is capable of transmitting, receiving, and duplicating documents. In particular, these embodiments of a facsimile printer are able to reliably operate with only one stepping motor. Secondly, the facsimile printer presented uses eccentric cams positioned on the same pivot in which the white roller is positioned on. These eccentric cams are used to displace the scanner or the thermosensitive recording head from the white roller when their use is not required for the current operation. In essence, these cams are used to change the mode of operation of the device. In particular, the eccentric cams displace either the scanner or the recording head away from the white roller when a particular operation does not call for their use. It will be understood by those skilled in the art that various changes and modifications may be made, and equivalents made be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mode contemplated for carrying out the present invention, but that the present invention includes all embodiments falling within the scope of the appended claims.

What is claimed is:

1. A facsimile system for transmitting, receiving, and duplicating documents, said system comprising:

an axle;

a thermosensitive recording head for recording data received onto thermosensitive recording media;

a contact image sensor disposed to electro-optically scan and transmit images borne by a document conveyed past said image sensor;

a roller supported by said axle and having a first end axially opposite from a second end, and a reflective exterior circumferential surface positioned to respectively convey thermosensitive recording media and at least one document past said thermosensitive recording head and said contact image sensor while in respective axial tangential engagement with said thermosensitive recording head and said contact image sensor;

a first frame spaced apart from a second frame, said first frame and said second frame supporting said axle and adapted to position said thermosensitive recording head and said contact image sensor in parallel axial alignment with said axle and in tangential engagement with said exterior circumferential surface and adapted to accommodate radial movement of said thermosensitive recording head and said contact image sensor from said tangential engagement;

a pair of cams, each one of said cams having an apogee exhibiting a radial dimension greater than said circumferential surface and a perigee exhibiting a radial dimension not greater than said circumferential surface, a first one of said pair of cams located at said first end of said roller and a second one of said pair of said cams located at said second end of said roller, each of said cams mounted upon said axle with said apogee of each of said pair of cams being in radial alignment to alternately radially displace said thermosensitive recording head and said contact image sensor from said tangential contact with said exterior circumferential surface;

a motor; and a gear unit and a shaft disposed to convey motive power from said motor and to respectively rotate said pair of cams and said roller relative to said thermosensitive recording head and said contact image sensor.

2. The system of claim 1, wherein:

said first frame and said second frame holds said thermosensitive recording head and said contact image sensor in approximate diametric opposition on opposite sides of said circumferential surface; and said apogee of said pair of cams extends farther radially from said axle than said exterior circumferential surface, causing said thermosensitive recording head and said contact image sensor to alternately move away from said roller as said cams rotate about said axle.

3. The system as recited in claim 1, wherein said motor during its forward rotation is adapted to rotate only said pair of cams and during its reverse rotation is adapted to rotate only said roller.

4. The system of claim 1, wherein said motor is adapted to position said apogee of each of said pair of cams intermediate said thermosensitive recording head and said contact image sensor while said facsimile system duplicates said images borne by the at least one document as said data recorded onto the recording media.

5. The system of claim 1, wherein:

said apogee of each of said pair of cams is adapted to separate said thermosensitive recording head from said roller while the at least one document is conveyed between said contact image sensor and said roller during transmission of said images;

said apogee of each of said pair of cams is adapted to separate said contact image sensor from said roller while the thermosensitive recording media is conveyed during reception of said data received; and said apogee of each of said pair of cams is adapted to be positioned to allow said roller to axially and tangentially contact both said thermosensitive recording head and said contact image sensor and allow said roller to convey the at least one document and the thermosensitive recording media while duplicating said images borne by the at least one document as said data onto the thermosensitive recording media.

6. The system of claim 5, further comprising:

a sensor detecting lever connected to said shaft, said shaft installed in communication with said second frame, said shaft transmitting the force of said motor; and a status sensor exhibiting distinct electrical states in response to movement of said sensor detecting lever by the rotation of said sensor detecting lever, wherein said status sensor exhibits a first of said states during stand-by, reception, and duplication operations, and said status sensor exhibits a second of said states during transmission operations.

7. The system of claim 1, wherein each of said pair of cams is respectively mounted on said axle of said roller, each of said pair of cams being of the same size, shape, and orientation, said apogee of each of said pair of cams extending radially outward from said exterior circumferential surface of said roller.

8. The system as recited in claim 6, wherein during forward rotation, said motor rotates said sensor detecting lever via said gear unit and said shaft, thereby switching on or switching off said status sensor, said status sensor being installed on said second frame.

9. A facsimile device for transmitting, receiving, and duplicating documents, comprising:

a thermosensitive recording head;

a contact image sensor;

a roller disposed in communication with an axle, said roller bearing a exterior reflective circumferential surface exhibiting uniform optical characteristics;

a first frame spaced axially apart by said roller, said contact image sensor and said thermosensitive recording head from a second frame, said first frame and said second frame supporting said axle and holding said thermosensitive recording head and said contact image sensor in radially movable relations from tangential engagement with said exterior circumferential surface of said roller and in approximate diametric opposition on opposite sides of said circumferential surface;

a pair of cams respectively installed on said axle at opposite ends of said roller;

a stepping motor attached to said first frame, said stepping motor for driving a gear unit;

a shaft for driving additional gears of said gear unit by said stepping motor, said shaft installed in communication with said additional gears, said shaft being located in communication with said first frame and said second frame;

a sensor detecting lever in communication with said shaft; and a status sensor that is joined to or disjoined from said sensor detecting lever by the rotation of said sensor detecting lever for indicating a corresponding operational state corresponding to at least one of stand-by receiving, duplication and transmitting operations of said device, wherein rotation and orientation of said pair of cams selectively controlling stand-by, transmitting, receiving, and duplication operations according to the status of said status sensor.

10. The device of claim 9, wherein when said stepping motor rotates in a forward direction, said pair of cams are allowed to rotate at an angle of about ninety degrees from an initial stand-by position so that an apogee exhibiting a radial dimension greater than said circumferential surface of each of said pair of cams can force said thermosensitive recording head to be disjoined from said roller by upwardly pushing said thermosensitive recording head, and wherein said shaft rotates forward by the rotation of said stepping motor, causing said sensor detecting lever fixedly installed in communication with said shaft to rotate, said sensor detecting lever remaining in continuous contact with said status sensor, thus allowing a document containing an image to be fed between said contact image sensor and said roller and to transmit data and images from said document.

11. The device of claim 10, wherein when said stepping motor continues to rotate in the forward direction, said pair of cams installed on said axle are rotated by an angle of about one hundred and eighty degrees from said initial stand-by position, causing said apogee of each of said pair of cams to turn and to become separated from both said thermosensitive recording head and said contact image sensor, causing said thermosensitive recording head to move downward with respect to said roller so as to be in contact with said roller, said shaft rotates forward according to the forward rotation of said stepping motor, and said sensor detecting lever fixed to said shaft becomes disjoined from said status sensor.

12. The device of claim 11, wherein when said stepping motor continues to rotate in the forward direction, said apogee of each of said pair of cams rotates so as to be oriented about two hundred and seventy degrees from said initial stand-by position, causing said contact image sensor to be pushed away from said roller while said thermosensitive recording head remains in contact with said roller, said roller rotates forward, thus allowing a thermosensitive recording paper to be fed between said thermosensitive recording head and said roller and to record data received at said thermosensitive recording head onto said thermosensitive recording paper.

13. A method of adjusting a facsimile system, comprising:
for a stand-by state, positioning a thermosensitive recording head so as to be in contact with a portion of a white roller having an exterior surface; positioning a contact image sensor so as to be in contact with a different portion of said white roller; orienting a pair of cams positioned on an axle on which said white roller is disposed, each of said pair of cams having an apogee exhibiting a radial dimension greater than said exterior surface of said white roller, so that the apogee of each of said pair of cams does not contact either said thermosensitive recording head or said contact image sensor; and disjoining a status sensor from a sensor detecting lever fixedly connected to a shaft, said status sensor indicating a corresponding operational state of said facsimile system;

for data transmission, rotating a bidirectional stepping motor in a forward direction enabling said pair of cams positioned on said axle to be rotated through an angle of 90 degrees in such a manner that said apogee of each of said pair of cams makes contact with and forces upward said thermosensitive recording head causing said thermosensitive recording head to be disjoined from said white roller and to be inoperative;

rotating said shaft by the rotation of said stepping motor, thus rotating said sensor detecting lever fixedly connected to said shaft, said sensor detecting lever continuously remaining in contact with said status sensor, thereby performing a transmitting operation for data received by said contact image sensor;

for duplicating a document, continuing to rotate said pair of cams positioned on said axle until said thermosensitive recording head is in contact with a portion of said white roller while said contact image sensor is in contact with a different portion of said white roller;

where said white roller and said thermosensitive recording head are closely contacted with each other to permit duplicating a document, feeding a document between said contact image sensor and said white roller and recording data received by said contact image sensor onto thermosensitive recording paper inserted between said thermosensitive recording head and said white roller; and for receiving data, continuing to rotate said pair of cams positioned on said axle until said apogee of each of said pair of cams contacts and displaces said contact image sensor from said white roller, so that said thermosensitive recording paper can be fed between said thermosensitive recording head and said white roller and data received at said thermosensitive recording head can be recorded on said thermosensitive recording paper.

14. A facsimile device, comprising:
a first sidewall having an upper end portion and a lower end portion;

a second sidewall having an upper end portion and a lower end portion;

an image scanner placed between said lower end portion of said first sidewall and said lower end portion of said second sidewall;

a thermosensitive recording head placed between said upper end portion of said first sidewall and said upper end portion of said second sidewall, said thermosensitive recording head being parallel to said image scanner;

an axle placed between said first sidewall and said second sidewall, said axle placed between and running parallel to said image scanner and said thermosensitive recording head;

a rotatable white roller disposed in communication with said axle, said white roller having a first end and a second end, said white roller having an outer surface, said first end positioned near said first sidewall and said second end positioned near said second sidewall;

a rotatable first cam positioned on said axle between said first end of said white roller and said first sidewall, said first cam having an apogee exhibiting a radial dimension greater than said outer surface of said white roller and a perigee exhibiting a radial dimension not greater than said outer surface of said white roller;

a rotatable second cam positioned on said axle between said second end of said white roller and said second sidewall, said second cam having an apogee exhibiting a radial dimension greater than said outer surface of said white roller and a perigee-exhibiting a radial dimension not greater than said outer surface of said white roller, wherein said image scanner and said thermosensitive recording head are in contact with said white roller when said apogee of said first cam and said apogee of said second cam are not in contact with said image scanner and said thermosensitive recording head, allowing said device to be used for document duplication.

15. The device of claim 14, wherein when said apogee of said first cam and said apogee of said second cam are positioned to be in contact with said image scanner said image scanner is caused to become separated from said white roller, allowing for recording on a sheet of thermosensitive recording paper when said sheet of thermosensitive recording paper is inserted between said white roller and said thermosensitive recording head while said white roller is rotating.

16. The device of claim 14, wherein when said apogee of said first cam and said apogee of said second cam are positioned to be in contact with said thermosensitive recording head said thermosensitive recording head is caused to become separated from said white roller, allowing for scanning and transmission of an image from a document when said document is inserted between said white roller and said image scanner while said white roller is rotating.

17. The device of claim 14, further comprising a single motor providing motive power to said device.

18. The device of claim 17, wherein when said motor rotates in a forward direction said first cam and said second cam are simultaneously driven to rotate about said axle, and said apogee of said second cam is arranged to point in the same direction as said apogee of said first cam.

19. The device of claim 18, wherein said motor is rotated in a reverse direction to drive said white roller to rotate about said axle.

20. The device of claim 19, further comprising a gear unit and a shaft disposed to alternately transmit power from said motor to said white roller and said first cam and said second cam.

* * * * *